(No Model.)

G. W. TINSLEY.
HOSE COUPLING FOR STREET WASHERS.

No. 449,838. Patented Apr. 7, 1891.

Witnesses
V. M. Hood.
F. W. Olin

Inventor
George W. Tinsley
By H. P. Hood.
Attorney

UNITED STATES PATENT OFFICE.

GEORGE W. TINSLEY, OF COLUMBUS, INDIANA.

HOSE-COUPLING FOR STREET-WASHERS.

SPECIFICATION forming part of Letters Patent No. 449,838, dated April 7, 1891.

Application filed January 8, 1891. Serial No. 377,131. (No model.)

*To all whom it may concern:*

Be it known that I, GEORGE W. TINSLEY, a citizen of the United States, residing at Columbus, in the county of Bartholomew and State of Indiana, have invented a new and useful Hose-Coupling for Street-Washers, of which the following is a specification.

My invention relates to an improvement in a hose-coupling for street-washers, for which application for a patent, Serial No. 360,382, was allowed to me September 13, 1890. The coupling shown in the above-mentioned application consists of a tubular nut adapted to be screwed unto the supply-pipe and carrying an annular elastic packing, and provided with a pair of trunnions, to which a yoke is pivoted, said yoke being provided at its free end with a cam-lever jointed thereto and arranged to turn thereon in a plane parallel to the plane in which the yoke swings on the nut, so as to clamp a pipe-elbow to the nut, and arranged also to slide upon the yoke so as to fold within the street-washer box.

The object of my present improvement is to mount the cam-lever on the yoke in such a manner that it will remain permanently in position thereon and will fold into the same plane therewith, all as hereinafter set forth.

The accompanying drawings illustrate my invention.

Figure 2:
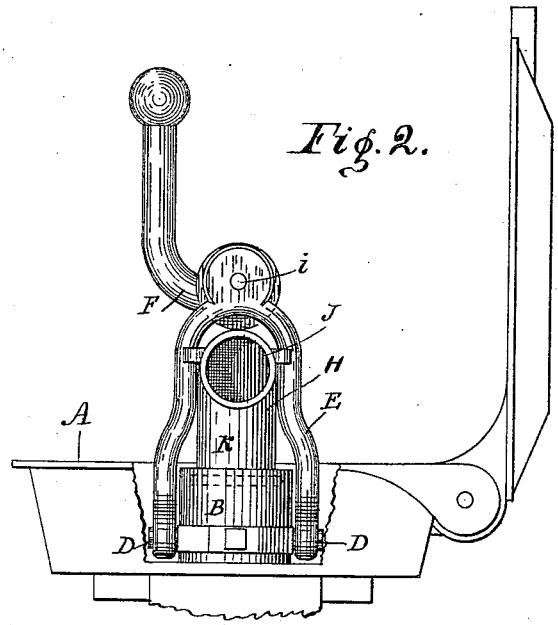
Figure 1:
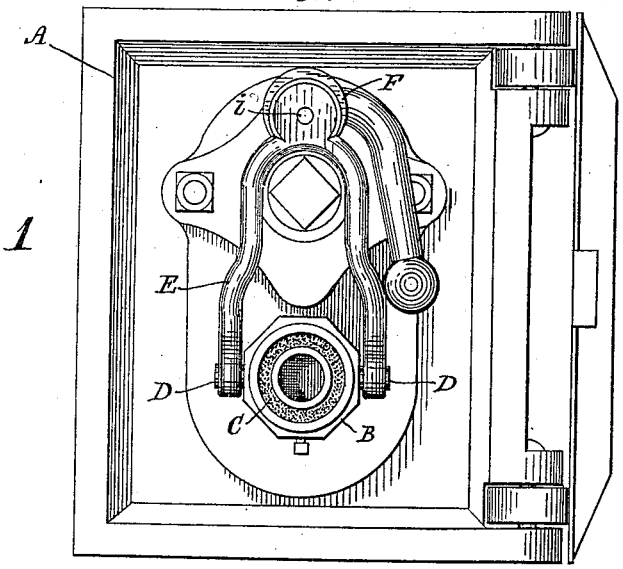
Figure 3:
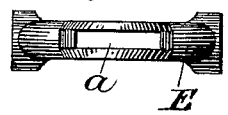

Figure 1 is a plan showing the coupling folded within the street-washer box and the hose removed. Fig. 2 is an elevation showing the coupling in working position. Fig. 3 is an end view of the clamping-yoke.

A is the street-washer box of the usual well-known construction.

B is a tubular nut adapted to be screwed upon the in water-supply pipe of the street-box, and having its upper surface an annular recess, in which an annular elastic washer C is embedded. Projecting from opposite sides of the nut B are a pair of trunnions D D, on which the ends of the yoke E are pivoted. The remaining free end of yoke E is mortised, as at *a*, to receive the cam-lever F, which is pivoted to the yoke at *i*, so as to swing thereon in a plane at right angles to the plane in which the yoke swings on the nut, and projects through the inner side of the yoke. An ordinary pipe-elbow H is secured to the hose, and forms the removable part of the coupling. The hose is secured permanently to one arm J of the elbow.

In operation the end of arm K of the elbow is placed on the annular washer C, and the yoke and its cam-lever being adjusted over the elbow, the cam-lever is raised to the position shown in Fig. 2, thus bringing the cam into engagement with the top of the elbow and clamping it securely to the nut A. The cam-lever being turned in the opposite direction is folded against the side of the yoke in the same plane therewith, the elbow is released, and the yoke falls within the box in the position shown in Fig. 1.

The care required to adjust the cam-lever on the yoke so as to fold within the box in the form shown in my application above mentioned is by this construction avoided.

It will be understood that the same coupling may be applied to a faucet or other like water-supply connection.

I claim as my invention—

In a hose-coupling, the combination of the tubular nut adapted to be secured to a water-supply pipe, the annular elastic washer mounted in one face of said nut, the yoke pivoted to the nut and swinging thereon so as to embrace a pipe-elbow and having a mortise in its free end, and the cam-lever pivoted in said mortise and arranged to swing on the yoke in a plane at right angles to the plane in which the yoke swings on the nut, all substantially as and for the purpose set forth.

GEORGE W. TINSLEY.

Witnesses:
H. P. HOOD,
V. M. HOOD.